(12) United States Patent
Cecil (10) Patent No.: US 11,657,207 B2
(45) Date of Patent: May 23, 2023

(54) WAFER SENSITIVITY DETERMINATION AND COMMUNICATION

(71) Applicant: Synopsys, Inc., Mountain View, CA (US)

(72) Inventor: Thomas Cecil, Menlo Park, CA (US)

(73) Assignee: Synopsys, Inc., Sunnyvale, CA (US)

( * ) Notice: Subject to any disclaimer, the term of this patent is extended or adjusted under 35 U.S.C. 154(b) by 28 days.

(21) Appl. No.: 17/378,423

(22) Filed: Jul. 16, 2021

(65) Prior Publication Data

US 2022/0035240 A1    Feb. 3, 2022

Related U.S. Application Data

(60) Provisional application No. 63/057,818, filed on Jul. 28, 2020.

(51) Int. Cl.
| | |
|---|---|
| *G06F 30/30* | (2020.01) |
| *G03F 7/20* | (2006.01) |
| *G06F 30/398* | (2020.01) |
| *G03F 1/70* | (2012.01) |
| *G06F 30/392* | (2020.01) |
| *G06F 119/18* | (2020.01) |

(52) U.S. Cl.
CPC ............ *G06F 30/398* (2020.01); *G03F 1/70* (2013.01); *G03F 7/705* (2013.01); *G06F 30/392* (2020.01); *G06F 30/30* (2020.01); *G06F 2119/18* (2020.01)

(58) Field of Classification Search
None
See application file for complete search history.

(56) References Cited

U.S. PATENT DOCUMENTS

| 6,578,190 | B2 * | 6/2003 | Ferguson | G03F 1/70 |
| | | | | 700/121 |
| 7,788,627 | B2 * | 8/2010 | Abrams | G03F 1/36 |
| | | | | 716/52 |
| 8,498,469 | B2 * | 7/2013 | Xiao | G06V 10/993 |
| | | | | 355/53 |
| 8,826,196 | B2 * | 9/2014 | Sahouria | G06F 30/398 |
| | | | | 716/55 |
| 8,910,098 | B1 * | 12/2014 | Lei | G03F 1/36 |
| | | | | 716/51 |
| 9,520,268 | B2 * | 12/2016 | Platzgummer | G06F 30/392 |
| 9,977,856 | B2 * | 5/2018 | Robles | G06F 30/398 |
| 2019/0163866 | A1 * | 5/2019 | Liu | G06F 30/33 |
| 2021/0149312 | A1 * | 5/2021 | Tel | H01L 22/20 |

* cited by examiner

*Primary Examiner* — Leigh M Garbowski
(74) *Attorney, Agent, or Firm* — Patterson + Sheridan, LLP (57) ABSTRACT

A method comprises receiving an integrated circuit (IC) chip design, and generating, by one or more processors, a wafer image and a wafer target from the IC chip design. The method further comprises generating, by the one or more processors, sensitivity information based on a determination that the wafer image and the wafer target converge, and outputting the sensitivity information. The sensitivity information is associated with writing a mask written for the IC chip design.

20 Claims, 9 Drawing Sheets

WAFER SENSITIVITY DETERMINATION AND COMMUNICATION

RELATED APPLICATION

This application claims the benefit of U.S. provisional patent application Ser. No. 63/057,818, filed Jul. 28, 2020, which is hereby incorporated herein by reference.

TECHNICAL FIELD

The present disclosure relates to generating mask design files including wafer sensitivity information for lithography manufacturing systems.

BACKGROUND

Integrated circuit (IC) chips are manufactured using lithography manufacturing systems and corresponding manufacturing processes. Mask synthesis tools are used to generate mask designs that used during the lithography manufacturing process. Mask writing tools generate the physical mask from the mask designs. The physical masks are used during the fabrication the IC chips based on the mask designs generated by mask synthesis tools. The mask synthesis tools implement optical proximity correction (OPC) and inverse lithography technology (ILT) processes, among others, to generate the mask designs. The mask writing tools generate one or more masks that are used by a lithography scanner to fabricate the IC chip. In one example, a set of masks, where each mask defines a different layer within the IC chip, is generated by the mask writing tools (devices). The masks may be generated by exposing, or writing, a pattern onto a resist-coated mask blank. The mask writing tools expose the mask blank to a pattern of light to form a pattern within the photosensitive materials on the mask blank. The mask writing tools include variable shaped beam (VSB) or multi beam mask writers (MBMW). The exposed mask blank is developed to generate the physical masks.

SUMMARY

In one example, a method comprises receiving an integrated circuit (IC) chip design, and generating, by one or more processors, a wafer image and a wafer target from the IC chip design. The method further comprises generating, by the one or more processors, sensitivity information based on a determination that the wafer image and the wafer target converge, and outputting the sensitivity information. The sensitivity information is associated with writing a mask written for the IC chip design.

In one example, a non-transitory computer readable medium comprising stored instructions, which when executed by a processor, cause the processor to receive an integrated circuit (IC) chip design and generate a wafer image and a wafer target from the IC chip design. The processor is further caused to generate sensitivity information based on a determination that the wafer image and the wafer target converge, and output the sensitivity information to a mask writing device.

In one example, a lithography system comprises a memory and a processor coupled with the memory. The processor is configured to receive an integrated circuit (IC) chip design, and generate a wafer image and a wafer target from the IC chip design. The processor is further configured to generate sensitivity information based on a determination that the wafer image and the wafer target converge, and output the sensitivity information from to a mask writing device.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to wafer sensitivity determination and communication.

A lithography manufacturing process is used to fabricate integrated circuit (IC) chips by exposing a mask (e.g. a photomask) disposed over a substrate to a pattern of light. The mask is generated by a mask synthesis engine and a mask writing device. The lithography manufacturing process is executed by the lithography manufacturing systems to the fabricate IC chips. Lithography manufacturing systems implement mask synthesis engines and mask writing devices, among other engines, during the fabrication process. The mask synthesis engines implement optical proximity correction (OPC) and inverse lithography technology (ILT) processes, among others, to generate the masks. The mask synthesis engine generates a mask design, or mask designs, based on the circuit design of the IC chip. For example, a mask synthesis engine determines the polygons (e.g., geometric shapes) of the mask that define the pattern of apertures (or openings or holes) within the mask based on the circuit design of the IC chip.

During the mask writing process, the mask is generated based on the mask design. The mask writing device includes variable shaped beam (VSB) tools or multi beam mask writer (MBMW) tools. During the fabrication process, the mask is disposed over a wafer (or substrate). A ultra-violet light, or other type of light, is applied to the wafer. The mask blocks light in regions that do not correspond to the apertures, and allows light to pass through regions corresponding to the apertures. As the light passes through the apertures, the light exposes photosensitive materials on the wafer in corresponding regions. The exposed (or non-exposed) regions are developed to remove portions of the photoresist material, generating a pattern on the wafer. The patterned wafer is then exposed to an etching and/or deposition process to fabricate the IC chip.

In many lithography manufacturing systems, there is a separation between the mask synthesis engine and the mask writing device such that the mask synthesis and mask writing devices are implemented independently from each other, making a tight coupling between the two difficult. In many instances, in the mask design to wafer fabrication process flow, the mask synthesis engine generates mask designs and communicates files containing the mask design to a mask writing device. For example, lithographic information is communicated from a mask synthesis engine to a mask writing device. The mask writing device utilizes the lithographic information to write physical masks replicating the mask shapes indicated by the mask geometry of the mask design file. During the mask writing process, errors may occur within the physical mask. The errors may negatively affect the final IC chip. However, as the mask synthesis engine and the mask writing device are independent from each other, and the mask writing device is unaware of the IC chip design details, the mask writing device has no knowledge of the impact of the errors that are introduced in the mask writing process on the final IC chip.

In the following, an improved lithography manufacturing process is described. For example, during the mask design stage, a corresponding sensitivity (e.g., a mask or wafer sensitivity) is determined. The sensitivity indicates the relative importance of different regions of the mask on the final IC chip. The sensitivity is communicated from a mask synthesis engine to a mask writing device. For example, the mask synthesis engine packages the sensitivity information within a compact file format which is then transferred to the mask writing device. Accordingly, a mask writing device may utilize the sensitivity information when generating a mask to produce a mask having a yield higher quality wafer, with reduced computational and runtime impact, as compared to other mask generation processes.

The mask writing device uses the sensitivity information to determine the relative importance of different parts of a mask. The mask writing device determines which portions of the mask are to be formed using more accurate writing algorithms, and which portions of the mask may be formed using writing algorithms having increased speed and simplification but lower accuracy. The mask writing device uses the sensitivity information to determine the effect of the mask writing process on the fabricated IC chip, and optimizes the mask for wafer quality in addition to, or alternatively to, mask quality. In various examples, determining and communicating the sensitivity information, such that the sensitivity information is used during the mask writing process, achieves higher manufacturing yields and more successful tape outs as compared to IC chip manufacturing processes that do not determine and use sensitivity information.

Figure 1:
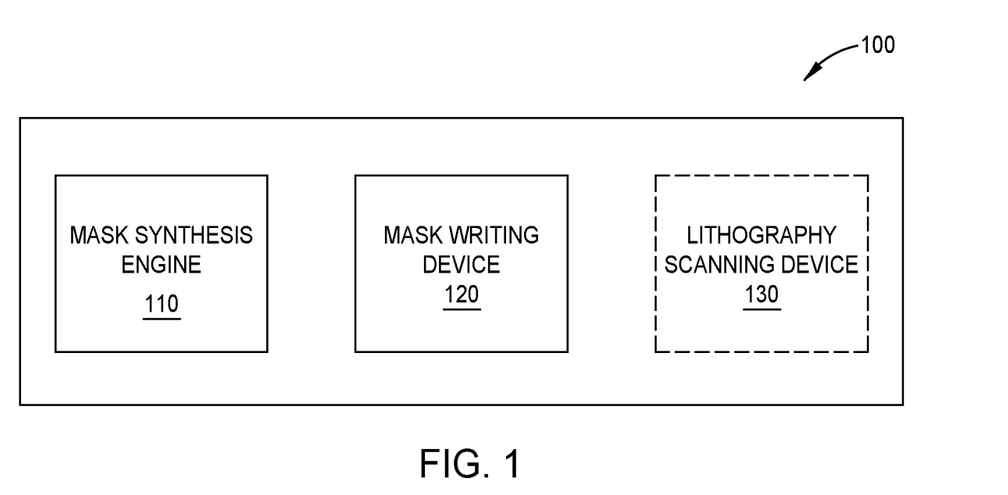
FIG. 1 illustrates an example block diagram of a lithography system, according to one or more examples.

FIG. 1 illustrates a lithography system 100, according to one or more examples. The lithography system 100 includes a mask synthesis engine 110 and a mask writing device 120. Further, the lithography system 100 may additionally include a lithography scanning device 130. The lithography scanning device 130 is optional, and, in some examples, the lithography scanning device 130 is omitted. The lithography system 100 includes one or more processing devices (e.g., the processing device 1102 of FIG. 11) and one or more memory devices (e.g., the main memory 1104 and/or machine-readable storage medium 1124 of FIG. 11). The one or more processing devices execute instructions (e.g., instructions 1126 of FIG. 11) stored in the one or more memory devices to receive IC chip designs, process the IC chip designs to determine sensitivities, and generate a physical mask.

The lithography system 100 receives an IC chip design and generates a mask design and sensitivity information from the IC chip design. Further, the lithography system 100 generates a physical mask from the mask design and sensitivity information and fabricates a printed wafer (substrate) using the physical mask.

The mask synthesis engine 110 receives an IC chip design (e.g., an IC chip design digital file). The IC chip design is received from a system connected to the lithography system 100 or an input device connected to the lithography system 100. In another example, the mask synthesis engine 110 receives the IC chip design from a memory. For example, the mask synthesis engine 110 accesses the memory to acquire the IC chip design. The mask synthesis engine 110 processes the IC chip design to generate a mask design and sensitivity information. Methods 200, 300, 400, 600, and 800, of FIGS. 2, 3, 4, 6, and 8, respectively, further describe the process for generating the sensitivity information.

The mask synthesis engine 110 communicates the mask design and sensitivity information to the mask writing device 120. The mask synthesis engine 110 communicates the mask design and sensitivity information via a network (e.g., the network 1120 of FIG. 11). In one example, the mask synthesis engine 110 includes one or more processors (e.g., the processing device 1102) of a computer system (e.g., the computer system 1100) and is coupled to the mask writing device 120 via a network (e.g., the network 1120). In such an example, the computer system of the mask synthesis engine 110 is physically separate from the mask writing device 120 and is connected to the mask writing device 120 via a network. Further, the computer system of the mask synthesis engine 110 and the mask writing device 120 are at different physical locations from each other.

The mask design and sensitivity information may be communicated in a common mask file or as separate files. In one example, the mask synthesis engine 110 packages the sensitivity information as a compact file format which is communicated to the mask writing device 120. The mask synthesis engine 110 may additionally, or alternatively, communicate the mask design file and/or sensitivity information to a memory of the lithography system 100.

Figure 11:
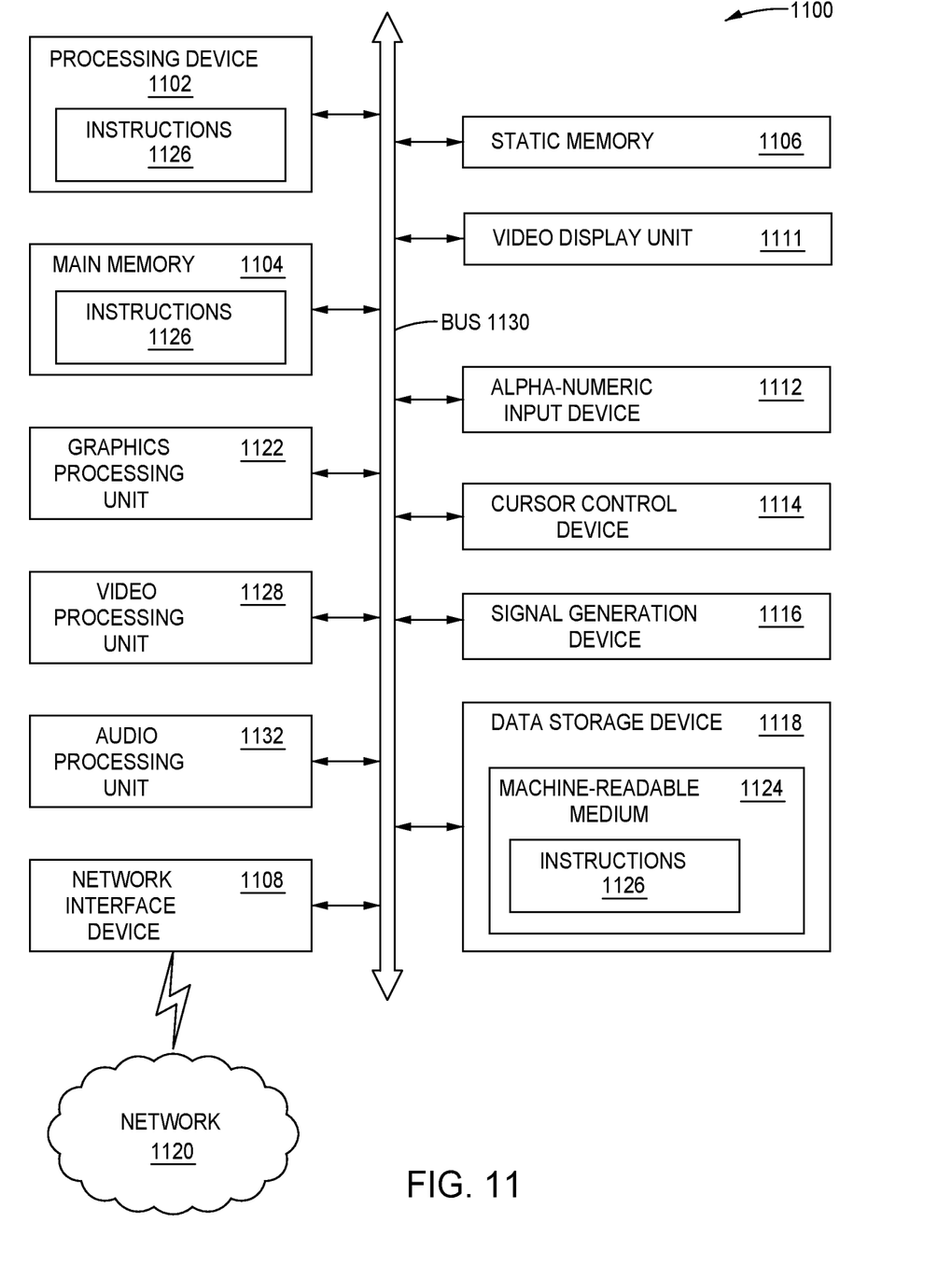
FIG. 11 depicts an abstract diagram of an example computer system in which embodiments of the present disclosure may operate.

The mask synthesis engine 110 includes one or more processing devices (e.g., the processing device 1102 of FIG. 11) that execute instructions (e.g., the instructions 1126 of FIG. 11) stored in a memory device (e.g., the main memory 1104 and/or machine-readable storage medium 1124 of FIG. 11) to receive the IC chip design file and generate the mask design file and the sensitivity information.

The mask writing device 120 receives the mask design file and the sensitivity information. In one example, the mask writing device 120 receives the mask design file and the sensitivity information from the mask synthesis engine 110. In other example, the mask writing device 120 accesses a memory device of the lithography system 100 to acquire the mask design file and the sensitivity information.

The mask writing device 120 determines a relative importance of different portions of the mask based on the sensitivity information. Further, the mask writing device 120 generates a printed mask based on the mask design file and the sensitivity information. In one example, the relative importance of the different portions of the mask corresponds to the accuracy of the operations that are used when generating the printed mask. For example, the mask writing device 120 determines which portions of the mask are to be formed with writing operations having a higher accuracy, and which portions of the mask can be formed with writing operations having a lower accuracy. Using writing operations having a higher accuracy reduces errors in the printed mask as compared to using writing operations having a lower accuracy. However, writing operations that have a higher accuracy are more processing time and computationally power extensive as compared to writing operations that have a lower accuracy. Accordingly, to mitigate errors within a printed mask, and to reduce the processing time and computationally power used during the mask writing process, writing operations having a higher accuracy are selectively applied when generating a printed a mask.

The printed mask may be generated from a mask blank (or substrate). The mask blank may be a silica blank, among others. Apertures (e.g., holes or openings) are formed in the mask blank during the printing process based on the polygons of the mask design file and the sensitivity information. A mask blank is coated with a photoresist material. The photoresist material is exposed to an energy beam that interacts with the photoresist material. The photoresist that is exposed to the energy beam becomes either sensitive or insensitive (depending on the type of photoresist) to the chemistry of the following development process. Photoresist that is sensitive to the chemistry of the development process is removed during the development process while photoresist is insensitive the development chemistry not removed to generate the mask.

The energy beam applied to the photoresist may be an electron beam or a photon energy beam. An electron beam is applied by an electron beam writer that directs a focused beam of electrons onto the blank. A photon energy beam is applied by a laser writer. The energy beam is controlled based on the writing operations. For example, the mask writing device 120 uses the writing operations to control the position and energy of the photon energy beam to control which parts of the mask are exposed to the electron beam and the amount of energy applied to the different parts of the mask. The accuracy of a writing operation may be measured based on the degree at which the writing operation reproduces the mask shape specified by the mask design file. In one example, different writing operations determine different energy amounts that are applied to different locations of a mask. The different energy amounts correspond to different amounts of the photoresist that are removed generating shapes with different sizes and/or orientations within the mask. Accordingly, the writing operation that generates a mask that most closely matches the mask shape specified by the mask design file may be considered to have the highest accuracy.

A mask is etched to remove portions of the blank where the photoresist coating has been removed. The etching process may include a liquid (e.g., wet) etching process or a plasma (e.g., dry) etching process. The etching processing removes portions of the blank where the photoresist coating has been removed, forming apertures (e.g., holes or openings) within the mask blank.

The mask writing device 120 includes one or more processing devices (e.g., the processing device 1102 of FIG. 11) that execute instructions (e.g., the instructions 1126 of FIG. 11) stored in a memory device (e.g., the main memory 1104 and/or machine-readable storage medium 1124 of FIG. 11) to receive the mask design file and sensitivity information and generate a printed mask. The mask writing device 120 additionally includes a mask writing tool, such as an electron beam writer or a laser writer, which applies an energy beam to a mask blank.

The lithography scanning device 130 receives the printed mask from the mask writing device 120 for fabrication of an IC chip. The lithography scanning device 130 positions the printed mask over a substrate and applies a light to the substrate through the printed mask. Light that passes through the apertures of the printed masks alters a property of corresponding portions of a photoresist material on the substrate. The light may be an ultraviolet (UV) light or another wavelength of light. The altered portions of the photoresist material are then removed from the substrate during a subsequent development process. The developed substrate (e.g., substrate with a patterned mask disposed thereon) is exposed to an etching and/or deposition process during the IC chip fabrication process. In one example, multiple different patterned masks are applied to a substrate at different times during the IC chip fabrication process.

Different parts of an IC chip design may be more sensitive than others to the lithography manufacturing process. To account for the parts of the IC chip design that are more sensitive than others, sensitivity information is determined by the mask synthesis engine 110 and communicated to the mask writing device 120. The sensitivity information provides an indication of the relative sensitivities to mask writing errors for the different parts (e.g., polygons) of the IC chip design. The sensitivity information corresponds to a dimension tolerance for the different polygons within the IC chip design. Polygons associated with a lower tolerance are more susceptible to errors during the mask writing and wafer fabrication process than polygons associated with a higher tolerance. The sensitivities identified by the sensitivity information are used by the mask writing device 120 to determine the level of accuracy to be used when writing the different areas of the mask. For example, the type of writing operation used by the mask writing device 120 may be based on the sensitivity information. Accordingly, areas associated with a higher sensitivity may be written with process controls that are more accurate than process controls that are used to write areas associated with a lower sensitivity, saving processing time and computational power, while increasing the accuracy of the printed mask as compared to mask writing processes that either use high accuracy process controls or lower accuracy process controls to write an entirety of the mask.

Figure 2:
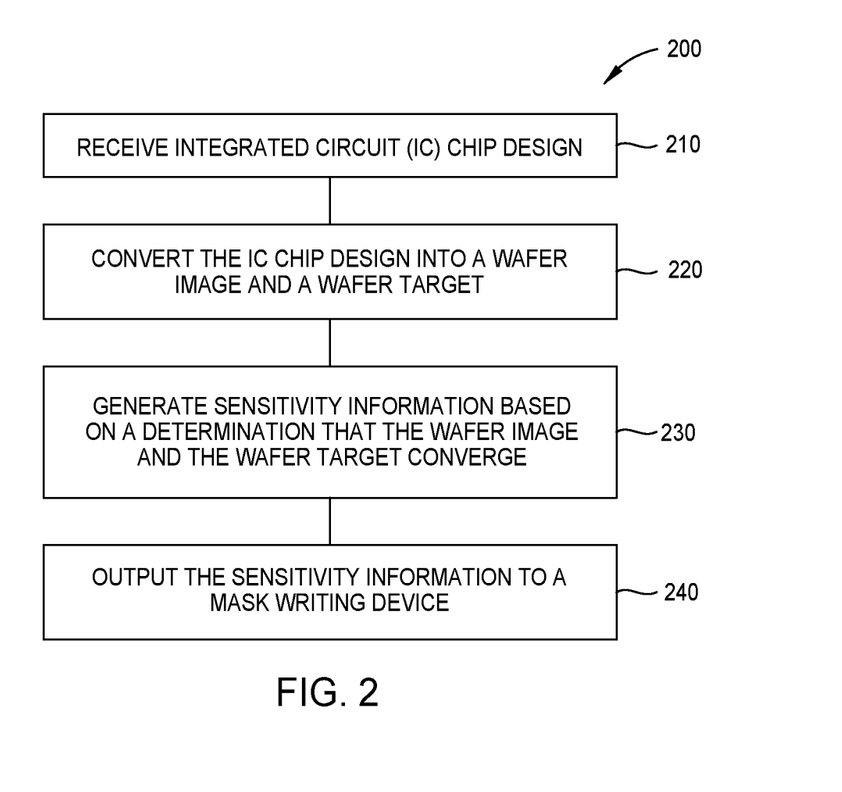
FIG. 2 illustrates a flowchart of a method for determining sensitivity information, according to one or more examples.

FIG. 2 illustrates a flowchart of a method 200 for generating sensitivity information, according to one or more examples. The method 200 is performed by the mask synthesis engine 110. At block 210, an IC chip design is received. For example, the mask synthesis engine 110 receives the IC chip design from another processing system, an input device, or a memory device. The chip design may be in a vector format (e.g., OASIS or GDS file format) or another file format.

At block 220, IC chip design is converted into a wafer image and a wafer target. In one example, the mask synthesis engine 110 converts the IC chip design into a wafer image and a wafer target. Converting the IC chip design into a wafer image includes converting the IC chip design into a mask representation and simulating the mask representation to generate a simulated mask and corresponding wafer image from the simulated mask. The mask representation may include a level set format, bitmap file format, or a polygon file format, among others. Converting the IC chip design into a wafer target includes identifying design polygons from the IC chip design and processing the design polygons to generate the wafer target. Processing the design polygons includes one or more of rounding the polygons to make a printable representation, rasterizing the polygons, creating a level set interface representation of the polygons, and selecting points or gauges on the wafer where the wafer image will be monitored.

At block 230, sensitivity information is generated based on a determination that the wafer image and the wafer target converge. For example, the mask synthesis engine 110 compares the wafer image and wafer target to determine if the wafer image converges with the wafer target and determines sensitivity information based on the wafer image and the wafer target converging. Comparing the wafer image with the wafer target includes generating a pixelated representation of the wafer image, and comparing the pixelated representation of the wafer image with the wafer target. A wafer image and a wafer target are determined to converge based on the difference between the pixelated representation of the wafer image and the wafer target being less than a threshold. In another example, comparing the wafer image with the wafer target includes sampling the wafer image. The samples are compared to corresponding points within the wafer target, comparing the intensity of the samples to corresponding points within the wafer target. A wafer image and a wafer target are determined to converge based on the difference between intensities being less than a threshold. In one example, comparing the wafer image with the wafer target includes comparing width and/or spacing information of the wafer image within corresponding thresholds. A wafer image and a wafer target is determined to converge based on the width and/or spacing of the wafer image satisfying the corresponding thresholds.

The mask synthesis engine 110 generates the sensitivity information based on determining that the mask image and mask target converge. The sensitivity information indicates the relative sensitivity of different parts of the IC chip design to mask writing errors. The sensitivity information may be represented by a map, a tabular representation, or other representation.

At block 240, the sensitivity information is output to a mask writing device. For example, the mask synthesis engine 110 communicates the sensitivity information to the mask writing device 120. The sensitivity information may be output as a vector file and/or as part of the vector file including the mask design.

Figure 3:
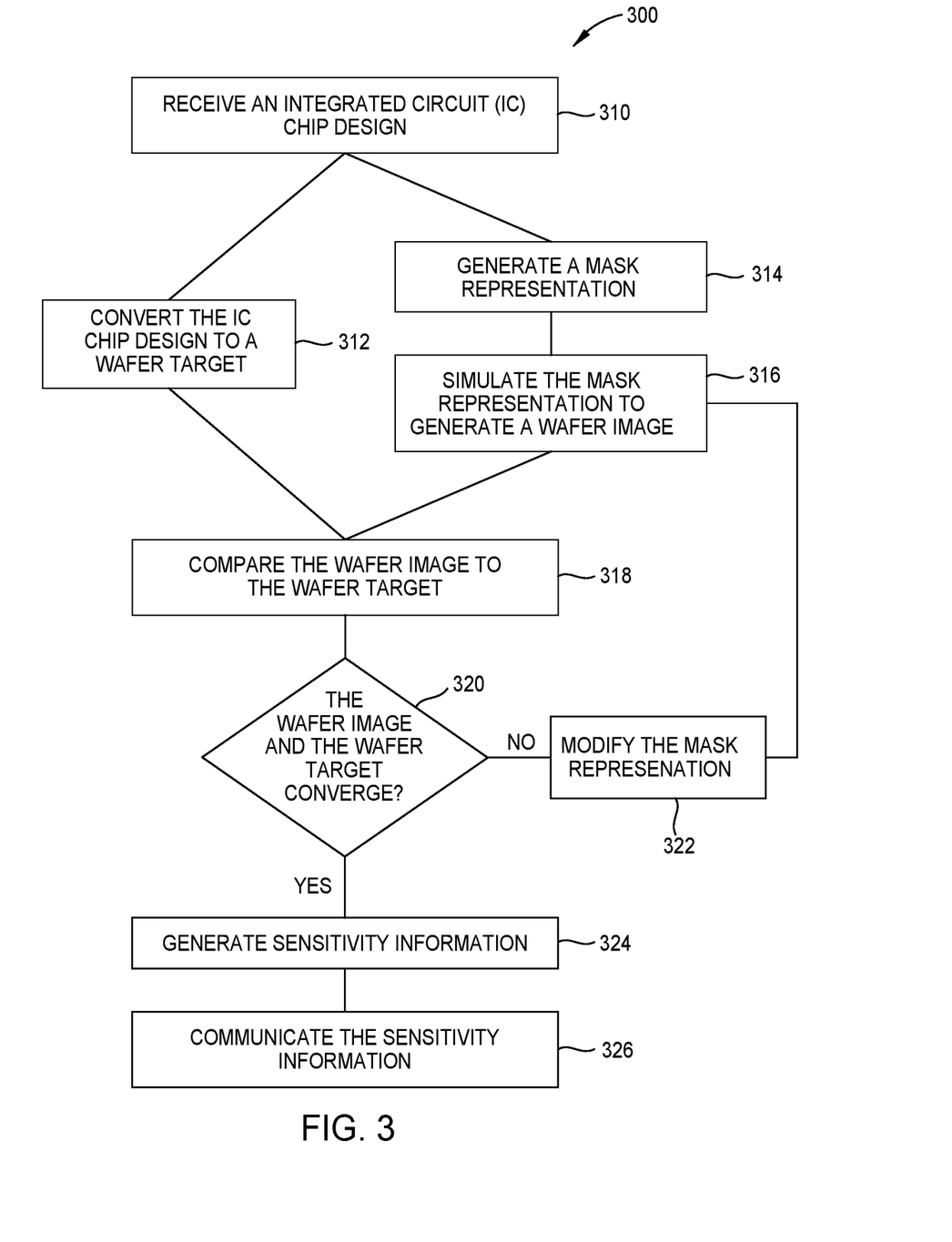
FIG. 3 illustrates a flowchart of a method for determining sensitivity information, according to one or more examples.

FIG. 3 illustrates a flow chart of a method 300 for generating sensitivity information, according to one or more examples. The mask synthesis engine 110 executes the method 300. At block 310, an IC chip design is received. For example, the mask synthesis engine 110 receives the IC chip design from another processing system, an input device, or a memory device. The chip design may be in a vector format (e.g., OASIS or GDS file format).

At block 312, the IC chip design is converted to a wafer target. The wafer target may be a bitmap file or a polygon file, among others. The mask synthesis engine 110 converts the IC chip design into a wafer target. In one example, converting the IC chip design into a wafer target includes identifying design polygons within the IC chip design and processing the design polygons to generate the wafer target. Processing the design polygons includes one or more of rounding the polygons to make a printable representation, rasterizing the polygons, creating a level set interface representation of the polygons, and selecting points or gauges on within the IC chip design where a wafer image will be monitored.

At block 314, a mask representation is generated from the IC chip design. The mask synthesis engine 110 generates the mask representation from the IC chip design. In one example, generating the mask representation generates an initial mask representation, which may be optimized. The mask representation is generated based on the design polygons of the IC chip design. For example, the design polygons are sized based on geometrical rules and/or converted into alternate geometric representations. The alternate geometric representations include level set mask or a rasterized mask.

At block 316, the mask representation is simulated to generate a wafer image. The mask synthesis engine 110 simulates the mask representation to generate the wafer image. For example, the mask representation generated at block 314 is used in a simulated fabrication process to generate a simulated fabricated wafer represented as the wafer image.

Block 312 is completed during a period that at least partially overlaps with the period or periods during which the blocks 314 and/or 316 are completed. In one example, block 312 is completed during a period that does not overlap with a period or periods during which the blocks 314 and/or 316 are completed.

At block 318, the wafer image is compared to the wafer target. For example, the mask synthesis engine 110 compares the wafer image and wafer target. Comparing the wafer image with the wafer target includes generating a pixelated representation of the wafer image, and comparing the pixelated representation of the wafer image with the wafer target. In another example, comparing the wafer image with the wafer target includes sampling the wafer image. The samples are compared to corresponding points within the wafer target, comparing the intensity of the samples to that of corresponding points within the wafer target. In one example, comparing the wafer image with the wafer target includes comparing a width and/or spacing of the wafer image with corresponding thresholds determined from the wafer target.

At block 320, a determination as to whether or not a wafer image and the target wafer converge is made. The mask synthesis engine 110 determines whether or not the wafer image and the target wafer converge. In one example, wafer image and a wafer target are determined to converge based on the difference between the pixelated representation of the wafer image and the wafer target being less than a threshold. In another example, a wafer image and a wafer target are determined to converge based on the difference between intensities of the wafer image and wafer target being less than a threshold. In yet another example, a wafer image and a wafer target are determined to converge based on the width and/or spacing of the wafer image satisfying a corresponding threshold or thresholds.

At block 322, the mask representation is modified based on the wafer image and wafer target not converging. The mask synthesis engine 110 modifies the mask representation based on the wafer image and wafer target not converging. Modifying the mask representation includes applying one or more of gradient based optimization methods, perturbation (e.g., numerical gradient) optimization methods, and rule based modifications. These modifications can have the goal of converging the wafer image and target. The modifications may also take into account other constraints such as mask rules. The mask rules may include minimum width and space, as well as lithographic or manufacturing goals of the corresponding lithographic manufacturing system and/or processing method. The mask synthesis engine 110 simulates the optimized mask representation to generate an updated wafer image at block 316 which is compared to the wafer target at block 318. The mask synthesis engine 110 determines if the updated wafer image converges with the wafer target at block 318. Based on determining that the updated wafer image does not converge with the wafer target, the loop including blocks 322, 316, 318, and 320 is repeated until a determination that an updated wafer image converges with the wafer target.

Figure 4:
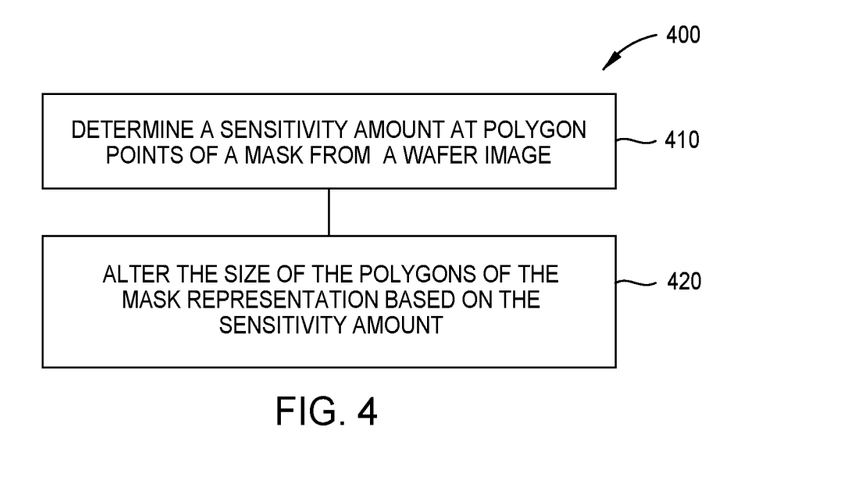
FIG. 4 illustrates a flowchart of a method for determining sensitivity bands, according to one or more examples.
Figure 6:
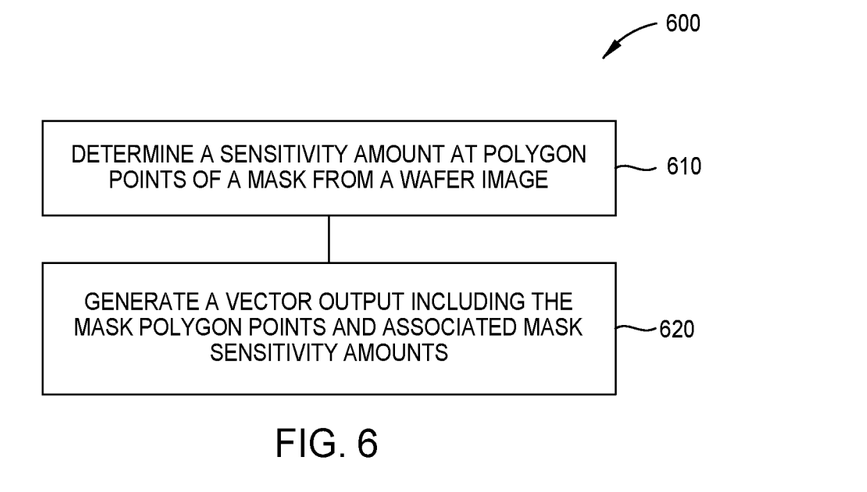
FIG. 6 illustrates a flowchart of a method for determining sensitivity amounts, according to one or more examples.
Figure 8:
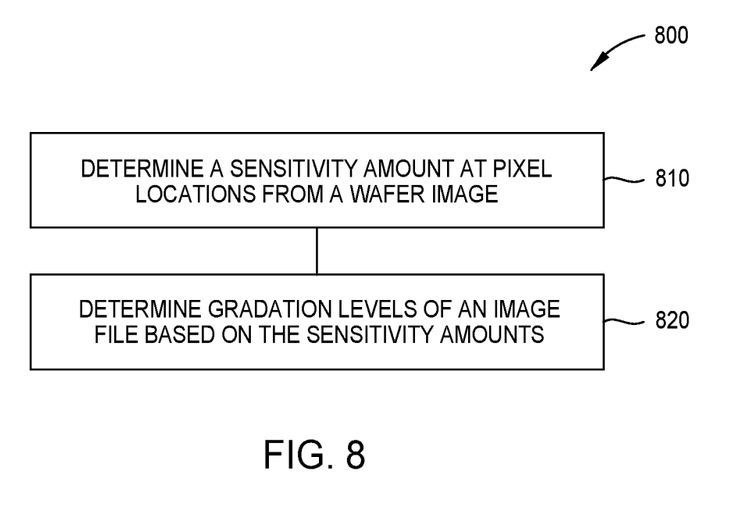
FIG. 8 illustrates a flowchart of a method for determining sensitivity gradations, according to one or more examples.

At block 324, the sensitivity information is generated based a determination that the wafer image and the wafer target converge. In one example, the mask synthesis engine 110 generates the sensitivity information based on determining that the wafer image and wafer target converge. The sensitivity image is determined based on the wafer image that is determined to converge with the wafer target. The sensitivity information indicates the relative sensitivity of different parts of the IC chip design to errors that may occur when writing the corresponding mask. Methods 400, 600, and 800 of FIGS. 4, 6, and 8 provide further details regarding the generation of sensitivity information.

At block 326, the sensitivity information is output to a mask writing device. For example, the mask synthesis engine 110 communicates the sensitivity information to the mask writing device 120. The sensitivity information may be output as a vector file and/or as part of the vector file including the mask design.

Figure 10:
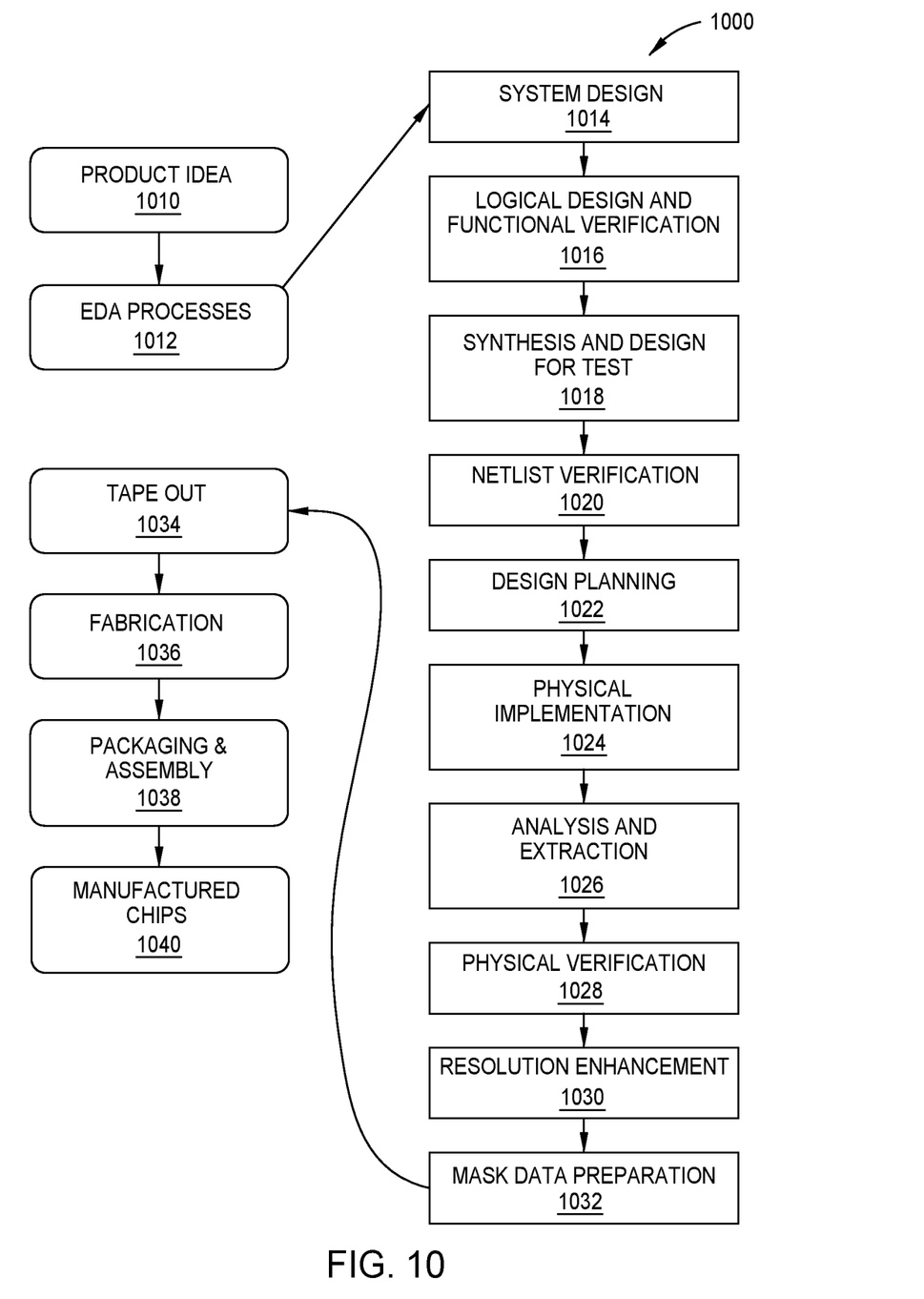
FIG. 10 depicts a flowchart of various processes used during the design and manufacture of an integrated circuit in accordance with some embodiments of the present disclosure

The methods 200 and 300 may correspond to step of mask data preparation 1032 of FIG. 10. For example, when preparing the mask data during mask data preparation 1032 of FIG. 10, the method 200 and/or the method 300 are performed.

Figure 5:
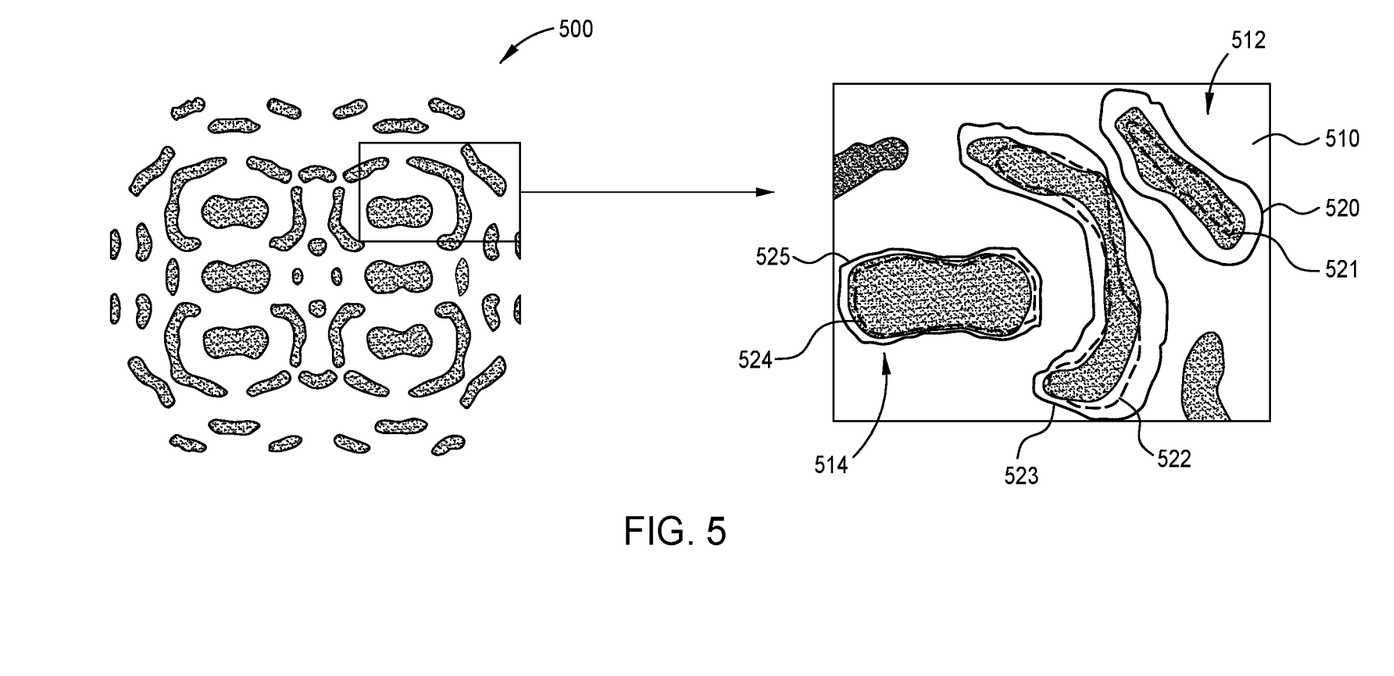
FIG. 5 illustrates example sensitivity bands, according to one or more examples.

In one example, generating sensitivity information includes generating sensitivity bands. FIG. 4 illustrates a flowchart of the method 400 for generating sensitivity bands and FIG. 5 illustrates example sensitivity bands, according to one or more example. The method 400 corresponds to the block 324 of the method 300 of FIG. 3. At block 410, sensitivity values at one or more polygon points of a wafer image is determined based on a determination that the wafer image and wafer target converge. The mask synthesis engine 110 determines the sensitivity values by simulating a mask representation that was used to generate the wafer image determined to converge with the wafer target. During simulation of the mask representation, mask edges are determined and perturbed to generate a plurality of images. The wafer resulting metrics of each image are compared. For example, one or more of the edge placement error and processor variation band width, among others, of each image are compared. In one example, the image contours may be overlaid one or more of the plurality of images. The width of the outer envelope of the contours approximate, e.g., near, the locations where the mask representation was perturbed may be measured. A sensitivity value is determined based on the comparison of each edge of each polygon and assigned to each edge. In one example, sensitivity value may be stored as an offset value for a corresponding point along a polygon. An offset value is determined for each point along each polygon.

A sensitivity value is expressed in the units of change in the wafer image contour location with reference to the perturbation applied to the mask representation. For example, the change in wafer image contour may be represented in nanometers and the change in mask perturbation (e.g., distances a mask edge or edges are moved) may be represented in nanometers. Accordingly, a sensitivity value of 1 corresponds to a change in the wafer image contour of 1 nm based on the mask edge being moved by 1 nm when perturbing the mask representation. In one example, the sensitivity values may be in a range of about 0 to about 10. In one or more examples, the sensitivity values may be larger than 10. As the sensitivity values increase, the possibility of errors within the printed mask occurring increases. To mitigate the errors within the printed mask, the accuracy of the mask manufacturing processes is increased. In examples using process variation bands, the envelope width in nanometers is the sensitivity value.

At block 420, the size of the polygons of the mask representation are altered based the sensitivity value. For example, the mask synthesis engine 110 sizes the polygons of the mask representation outward and inward based on a corresponding sensitivity value to determine the sensitivity bands for each of the polygons. Example sensitivity bands are illustrated in FIG. 5. Each polygon point of each polygon has an associated sensitivity value. The sensitivity value may be a positive scalar value. The polygons of the mask pattern are sized locally using a variable sizing operation such that each polygon point is offset from a corresponding original location in an outward normal direction by a corresponding sensitivity value. The polygons of the mask pattern are further sized locally using a variable sizing operation such that each polygon point is offset from a corresponding original location in an inward normal direction by a corresponding sensitivity value. The sensitivity bands are generated by the inwardly and outwardly sized polygons to generate the sensitivity information.

In one example, during block 410, multiple offset values (i.e., distances) for each point along a polygon are determined. In such an example, at block 420, the polygons are inwardly and outwardly sized based on each offset value. Sensitivity bands may be determined for each inwardly and outwardly sized polygon. Alternatively, sensitivity bands may be determined based on the largest, smallest, or an average of each of the inwardly and outwardly sized polygons.

FIG. 5 illustrates example sensitivity information of a mask design. The sensitivity information may be communicated using a vector based format (e.g., OASIS or GDS file format, among others). The region 510 of the mask design 500 includes sensitivity bands 520-526 surrounding each of the mask polygons. The sensitivity bands 520-526 indicate relative sensitivities of corresponding areas of the IC chip design to variations that may occur during a mask writing process and/or fabrication of the IC chip. For example, the sensitivity bands 520-526 indicate how sensitive different regions (e.g., polygons) of a mask are to changes made during the mask writing process. The distance between the sensitivity bands 520-526 may indicate different relative sensitivities. In one instance, larger distances correspond to regions of lower sensitivity and smaller distances correspond to regions of higher sensitivity. In one example, the sensitivities may be represented as the edge placement error of the wafer image with respect to the target image for a given mask perturbation. Further, process variation bands resulting from perturbed images may be used as the mask sensitivities. The process variation bands include the outer envelope of the overlaid process variation image contours including images from off focus conditions, over or underexposed conditions, and/or globally biased mask conditions, among others. In one or more examples, a function of the sensitivity decreasing as the sensitivity increases may be used to determine the width or offset of the sensitivity band from the mask edge (e.g., edge of a polygon of a mask representation). Accordingly, higher sensitivities correspond to lower band widths.

Mask manufacturing results which violate the relationship of the sensitivity bands include violations on the wafer that are outside of the design parameters for the wafer. Tighter bands (e.g., a smaller distance between sensitivity bands) indicate that the wafer is more sensitive to mask variations in those regions. Looser bands (e.g., a larger distance between sensitivity bands sensitivity bands) indicate that the wafer is less sensitive to mask variations in those regions. As illustrated in FIG. 5, the distance between the sensitivity bands 524 and 525 is less than that of the distance between the sensitivity bands 522 and 523 and the distance between the sensitivity bands 520 and 521. Accordingly, the sensitivity bands 524 and 525 indicate a region of higher sensitivity than that indicated by the sensitivity bands 520, 521, 522, and 523.

In one example, communicating sensitivity information to the mask writing device 120 includes sending a mask design file including the sensitivity bands as indicated within the example of FIG. 5 or sending the sensitivity bands in addition to communicating the mask design file. However, in other embodiments, the distances between sensitivity bands 520-525 are communicated as a vector file formats (e.g., OASIS or GDS file formats, among others) instead of communicating the sensitivity bands themselves, to reduce the amount of information that is communicated between the mask synthesis engine 110 and the mask writing device 120. The size of the file utilized to communicate the distances is less than the size of a file utilized to communicate sensitivity bands along with the mask design file. In one or more embodiments, a uniform sensitivity value is determined for polygon vertices near each other. In such embodiments, instead of generating a full outline of a polygon, a sensitivity band width at a few specific key points along the polygon edge path are determined.

Figure 7:
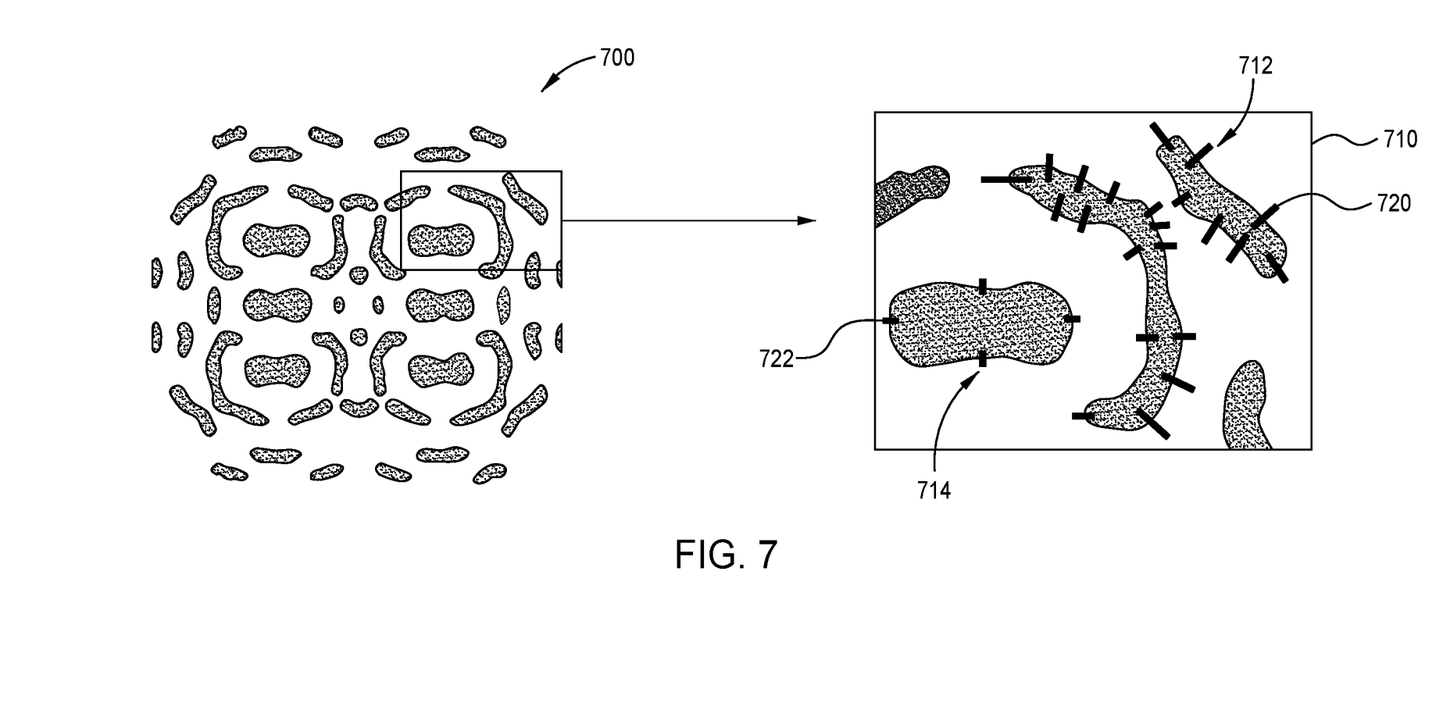
FIG. 7 illustrates example sensitivity amounts, according to one or more examples.

In one example, generating sensitivity information includes generating variation amounts for different points along the polygons of a mask pattern. FIG. 6 illustrates a flowchart of the method 600 for generating the variation amounts and FIG. 7 illustrates a mask pattern with example variation amounts. At block 610 of the method 600, sensitivity at one or more polygon points is determined based on a determination that the wafer image and wafer target converge. The mask synthesis engine 110 determines the sensitivity values by simulating a mask representation that was used to generate the wafer image determined to converge with the wafer target. During simulation of the mask representation, mask edges are determined and perturbed to generate a plurality of images. The wafer resulting metrics of each image are compared. For example, one or more of the mask edge placement error and processor variation band width, among others, of each image are compared. A sensitivity value is determined based on the comparison performed for each polygon edge and assigned to each polygon edge. The sensitivity value may be stored as an offset value for a corresponding point along a polygon. An offset value is determined for each point along each polygon.

At block 620, an output file including the mask polygon points and associated sensitivity amounts is generated. For example, in one example, the mask synthesis engine 110 generates an output file including the mask polygon points and associated sensitivity value. The output file may be a vector file. Further, the output file may be in a tabular format. In such an example, the point coordinates of the points along the polygons are associated with the corresponding sensitivity values. The vector output file may be an OASIS file or a GDS vector file format, among others.

FIG. 7 illustrates a mask design with associated local sensitivity values (e.g., local variation amounts) at different points along a polygon of a mask pattern. The sensitivity values may be indicated by a length of a line at each of the different points along the polygon path (e.g., mask edge). In one or more examples, the length of the line perpendicular to the mask edge is be determined similar to how the offset is determined with regard to the method 400 of FIG. 4 and indicated by the sensitivity bands of FIG. 5. Areas of a mask pattern indicated by larger amounts of variation have a lower sensitivity as compared to areas of a mask pattern indicated by smaller amounts of variation. In other examples, areas of a mask pattern indicated by larger amounts of variation have a higher sensitivity as compared to areas of a mask pattern indicated by smaller amounts of variation. FIG. 7 illustrates example mask pattern 700. The region 710 of the mask pattern 700 includes geometric shapes (e.g., polygons) 712 and 714. The geometric shape 712 is associated with variation amount 720 and the geometric shape 714 is associated with variation amount 722. In one example, as the variation amount 722 is less than the variation amount 720, the geometric shape 714 is associated with a higher sensitivity than that of the geometric shape 712.

In one example, the sensitivity information generated by the method 400 includes similar information as the sensitivity information generated by the method 600. Further, in one example, the sensitivity information generated by the method 600 may include additional information as compared to sensitivity information generated by the method 400. For example, the sensitivity information generated by the method 600 may be determined using multiple lithography metrics (e.g., such as edge placement error, and process variation bands, among others). Accordingly, multiple sources of information may be stored for each point location along a polygon. For example, the offset value of the band for a particular metric may be stored, and/or multiple offset distances may be stored for each lithography metric.

Figure 9:
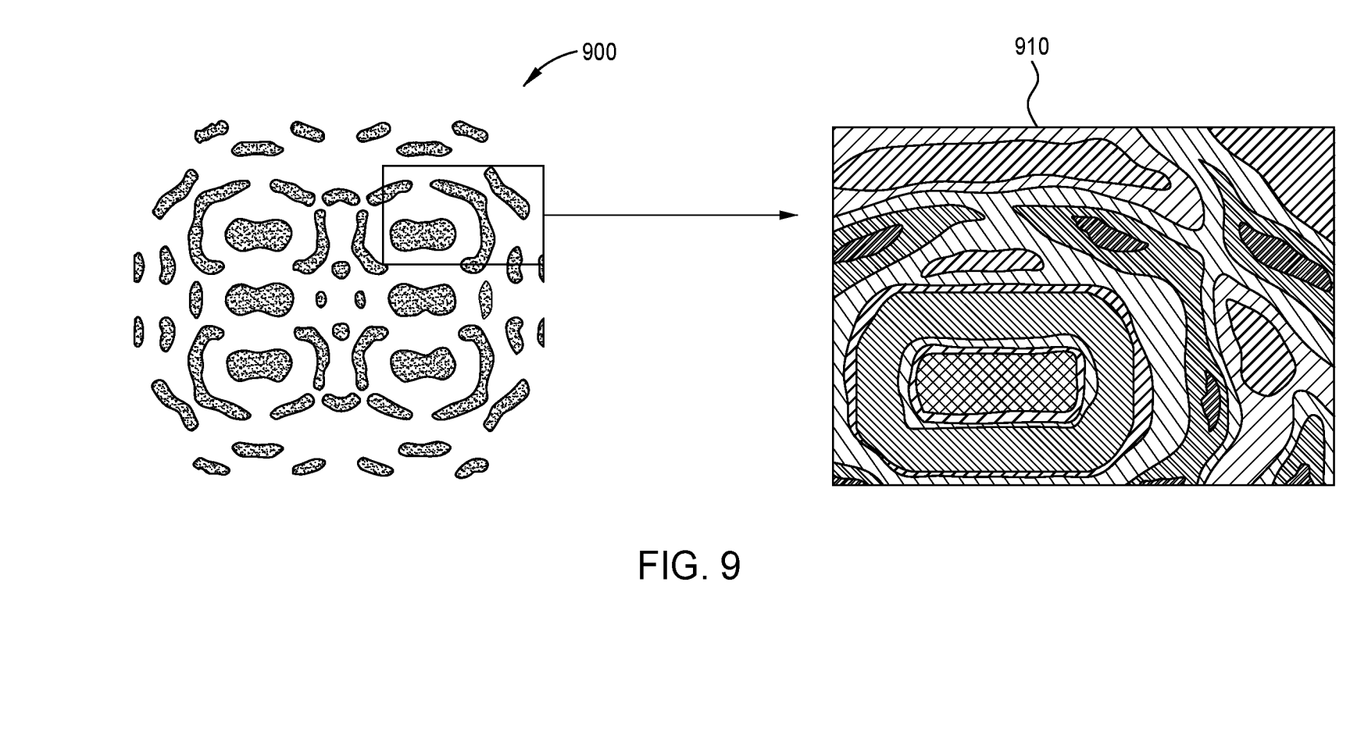
FIG. 9 illustrates example sensitivity gradations, according to one or more examples.

In one example, generating sensitivity information includes generating an image file with a gradation illustrating the sensitivity information. FIG. 8 illustrates a flowchart of a method 800 for generating the image file and gradation. FIG. 9 illustrates an example image file 900 of a mask design with example gradation illustrated in region 910 as different hatchings and crosshatchings. At block 810 of the method 800, a sensitivity value at one or more polygon points is determined based on a determination that the wafer image and wafer target converge. The mask synthesis engine 110 determines the sensitivity by simulating a mask representation that was used to generate the wafer image determined to converge with the wafer target. The mask representation of the converged wafer image is converted into an image file (e.g., bitmap file or other raster image file) function representation. For example, the mask representation is converted into a rasterized mask representation or a level set function representation. A level set function representing the interface or polygon in two dimensions is a pixelated representation in two dimensions where the location of the interface is defined as the location where the pixel values are a specific scalar value such as 0. The insides of the polygon will have positive pixels and the outside will have negative pixels, or vice versa. Level set methods include fast marching and fast sweeping, among others. The level set methods generate a level set from a polygon within the mask representation.

Each image file of the image file function representation is perturbed in the pixel domain and the mask representation generated by perturbing the pixels is simulated to generate a plurality of images. The wafer resulting metrics of each image are compared to generate sensitivity values for each pixel. For example, one or more of the edge placement error and processor variation band width, among others, of each image are compared. The error or errors may be determined similar to as described with regard to the method 400 of FIG. 4. In another example, the error or errors may be determined by comparing the pixelized representation of the wafer images to each other and finding the range of the values at each pixel. This range will be large if the wafer image is more sensitive to mask changes and small if the wafer image is less sensitive to mask changes. In another example, the images are converted to levelset distance functions and then the range of these levelset functions are used at each pixel. Further, sensitivity values are determined based on the comparison for each pixel and assigned to each pixel.

At block 820, an image file including a gradation indicating the sensitivity values is generated. For example, the mask synthesis engine 110 generates the image file and corresponding gradations based on the sensitivity values for each pixel. The image file may be a bitmap or other rasterized image file type. FIG. 9 illustrates an example image file 900 with gradations shown in region 910. The gradations are shown as different hatchings and crosshatchings. Each level of the gradation may indicate a different sensitivity. The number of gradations corresponds to the accuracy level. For example, for a higher accuracy, a larger number of gradations are used, as compared to a smaller accuracy that uses a smaller number of gradations. The smaller number of gradations uses a smaller number of data bits, as compared to the higher number of gradations, to communicate the sensitivity representation for each pixel. As illustrated in FIG. 9, the gradations within region 910 of an image file 900 illustrates the sensitivity values of the respective polygons. In one example, the number of gradation levels represents different sensitivity values. The areas associated with a higher sensitivity value are indicated by a gradation with a larger number of gradation levels than areas associated with a lower sensitivity value.

In the above, an improved lithography manufacturing process is described. The improved lithography manufacturing process includes generating sensitivity information that indicates the relative importance of different regions of the mask on the final IC chip. The sensitivity information is communicated from a mask synthesis engine to a mask writing device. For example, the mask synthesis engine packages the sensitivity information within a compact file format which is then transferred to the mask writing device. Accordingly, a mask writing device may utilize the sensitivity information when generating a mask to produce a mask to increase the production yield and wafer, with reduced computational and runtime impact, as compared to other mask generation processes.

FIG. 10 illustrates an example set of processes 1000 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1010 with information supplied by a designer, information which is transformed to create an article of manufacture that uses a set of EDA processes 1012. When the design is finalized, the design is taped-out 1034, which is when artwork (e.g., geometric patterns) for the integrated circuit is sent to a fabrication facility to manufacture the mask set, which is then used to manufacture the integrated circuit. After tape-out, a semiconductor die is fabricated 1036 and packaging and assembly processes 1038 are performed to produce the finished integrated circuit 1040.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 10. The processes described by be enabled by EDA products (or tools).

During system design 1014, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1016, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1018, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1020, the netlist is checked for compliance with timing constraints and for correspondence with the HDL code. During design planning 1022, an overall floor plan for the integrated circuit is constructed and analyzed for timing and top-level routing.

During layout or physical implementation 1024, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1026, the circuit function is verified at the layout level, which permits refinement of the layout design. During physical verification 1028, the layout design is checked to ensure that manufacturing constraints are correct, such as DRC constraints, electrical constraints, lithographic constraints, and that circuitry function matches the HDL design specification. During resolution enhancement 1030, the geometry of the layout is transformed to improve how the circuit design is manufactured.

During tape-out, data is created to be used (after lithographic enhancements are applied if appropriate) for production of lithography masks. During mask data preparation 1032, the 'tape-out' data is used to produce lithography masks that are used to produce finished integrated circuits. In one example, the lithography masks are generated based on method 200, 300, 400, 600, or 800 of FIG. 2, 3, 4, 6, or 8, respectively. For example, generating a lithography mask includes determining a mask design and sensitivity information by the mask synthesis engine 110 and writing a mask (e.g., lithography mask) based on the mask design and sensitivity information.

A storage subsystem of a computer system (such as computer system 1100 of FIG. 10) may be used to store the programs and data structures that are used by some or all of the EDA products described herein, and products used for development of cells for the library and for physical and logical design that use the library.

FIG. 11 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM), a static memory 1106 (e.g., flash memory, static random access memory (SRAM), etc.), and a data storage device 1118, which communicate with each other via a bus 1130.

Processing device 1102 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 may be configured to execute instructions 1126 for performing the operations and steps described herein.

The computer system 1100 may further include a network interface device 1108 to communicate over the network 1120. The computer system 1100 also may include a video display unit 1111 (e.g., a liquid crystal display (LCD) or a cathode ray tube (CRT)), an alphanumeric input device 1112 (e.g., a keyboard), a cursor control device 1114 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a non-transitory computer-readable medium) on which is stored one or more sets of instructions 1126 or software embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

In some implementations, the instructions 1126 include instructions to implement functionality corresponding to the present disclosure. While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1102 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   receiving an integrated circuit (IC) chip design;
   generating, by one or more processors, a wafer image and a wafer target from the IC chip design;
   determining that the wafer image and the wafer target converge based on a difference between the wafer image and the wafer target being less than a threshold;
   generating, by the one or more processors, sensitivity information based on the determination that the wafer image and the wafer target converge; and
   outputting the sensitivity information, wherein the sensitivity information is associated with writing a mask written for the IC chip design.

2. The method of claim 1 further comprising:
   determining a mask design file from the IC chip design; and
   outputting the mask design file from a mask synthesis engine to a mask writing device, wherein the sensitivity information indicates a sensitivity of one or more polygons of the IC chip design to mask writing errors.

3. The method of claim 1 further comprising:
   generating a mask representation from the IC chip design; and
   simulating the mask representation to generate the wafer image.

4. The method of claim 3 further comprising modifying the mask representation based on a determination that the wafer image and the wafer target do not converge.

5. The method of claim 1, wherein generating the sensitivity information comprises:
   determining a sensitivity value at one or more points along a polygon within the IC chip design by perturbing one or more edges within a mask representation corresponding to the wafer image.

6. The method of claim 5, wherein generating the sensitivity information further comprises altering a size of the polygon based on the sensitivity value.

7. The method of claim 1, wherein generating the sensitivity information comprises determining one of sensitivity bands of a polygon within the IC chip design, variation amounts of the polygon, and gradation levels for the polygon.

8. A non-transitory computer readable medium comprising stored instructions, which when executed by a processor, cause the processor to:
   receive an integrated circuit (IC) chip design;
   generate a wafer image and a wafer target from the IC chip design;
   determine that the wafer image and the wafer target converge based on a difference between the wafer image and the wafer target being less than a threshold;
   generate sensitivity information based on the determination that the wafer image and the wafer target converge; and
   output the sensitivity information to a mask writing device.

9. The non-transitory computer readable medium of claim 8, wherein the processor is further caused to:
   determine a mask design file from the IC chip design; and
   output the mask design file to the mask design file from a mask synthesis engine to the mask writing device.

10. The non-transitory computer readable medium of claim 8, wherein the processor is further caused to:
    generate a mask representation from the IC chip design; and
    simulate the mask representation to generate the wafer image.

11. The non-transitory computer readable medium of claim 10, wherein the processor is further caused to modify the mask representation based on a determination that the wafer image and the wafer target do not converge.

12. The non-transitory computer readable medium of claim 8, wherein generating the sensitivity information comprises:
determining a sensitivity value at one or more points along a polygon within the IC chip design by perturbing one or more edges within a mask representation corresponding to the wafer image.

13. The non-transitory computer readable medium of claim 12, wherein generating the sensitivity information further comprises altering a size of the polygon based on the sensitivity value.

14. The non-transitory computer readable medium of claim 8, wherein generating the sensitivity information comprises determining one of sensitivity bands of a polygon within the IC chip design, variation amounts of the polygon, and gradation levels for the polygon.

15. A lithography system comprising:
a memory; and
a processor coupled with the memory, the processor configured to:
receive an integrated circuit (IC) chip design;
generate a wafer image and a wafer target from the IC chip design;
determine that the wafer image and the wafer target converge based on a difference between the wafer image and the wafer target being less than a threshold;
generate sensitivity information based on the determination that the wafer image and the wafer target converge; and
output the sensitivity information to a mask writing device.

16. The lithography system of claim 15, wherein the processor is further configured to:
determine a mask design file from the IC chip design; and
output the mask design file to the mask writing device.

17. The lithography system of claim 15, wherein the processor is further configured to:
generate a mask representation from the IC chip design; and
simulate the mask representation to generate the wafer image.

18. The lithography system of claim 17, wherein the processor is further configured to modify the mask representation based on a determination that the wafer image and the wafer target do not converge.

19. The lithography system of claim 15, wherein generating the sensitivity information comprises:
determining a sensitivity value at one or more points along a polygon within the IC chip design by perturbing one or more edges within a mask representation corresponding to the wafer image.

20. The lithography system of claim 15, wherein generating the sensitivity information comprises determining one of sensitivity bands of a polygon within the IC chip design, variation amounts of the polygon, and gradation levels for the polygon.

* * * * *